(12) United States Patent
Makino et al.

(10) Patent No.: US 9,145,287 B2
(45) Date of Patent: Sep. 29, 2015

(54) MOTOR DRIVE APPARATUS FOR ELECTRIC FORKLIFT AND ELECTRIC FORKLIFT ADOPTING THE SAME

(71) Applicant: Sumitomo Heavy Industries, Ltd., Tokyo (JP)

(72) Inventors: Kennichi Makino, Kanagawa (JP); Takumi Itoh, Kanagawa (JP); Junichi Okada, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/178,876

(22) Filed: Feb. 12, 2014

(65) Prior Publication Data

US 2014/0231160 A1 Aug. 21, 2014

(30) Foreign Application Priority Data

Feb. 15, 2013 (JP) ................. 2013-028148

(51) Int. Cl.
*B66F 9/075* (2006.01)
*B60K 8/00* (2006.01)
*B60L 15/20* (2006.01)
*B60L 3/10* (2006.01)
*B60K 7/00* (2006.01)

(52) U.S. Cl.
CPC ........... *B66F 9/07572* (2013.01); *B60K 7/0007* (2013.01); *B60K 8/00* (2013.01); *B60K 7/00* (2013.01); *B60L 3/106* (2013.01); *B60L 15/20* (2013.01); *B66F 9/075* (2013.01); *Y02T 10/7258* (2013.01)

(58) Field of Classification Search
None
See application file for complete search history.

(56) References Cited

U.S. PATENT DOCUMENTS

| | | | | |
|---|---|---|---|---|
| 4,766,967 A * | 8/1988 | Slicker et al. | ................ | 180/54.1 |
| 5,406,486 A * | 4/1995 | Kamio et al. | ................... | 701/84 |
| 5,867,803 A * | 2/1999 | Kim et al. | ....................... | 701/85 |
| 6,061,622 A * | 5/2000 | Probst | ............................. | 701/84 |
| 6,182,003 B1 * | 1/2001 | Maier-Landgrebe | ........... | 701/84 |
| 7,203,578 B2 * | 4/2007 | Kuang et al. | .................... | 701/22 |
| 7,424,359 B2 * | 9/2008 | Fuchs et al. | .................... | 701/82 |
| 8,046,124 B2 * | 10/2011 | Muta et al. | ...................... | 701/22 |

(Continued)

FOREIGN PATENT DOCUMENTS

| | | |
|---|---|---|
| JP | 2007-336679 A | 12/2007 |
| JP | 2008-236914 A | 10/2008 |
| JP | 2012-186928 A | 9/2012 |

*Primary Examiner* — J. Allen Shriver
*Assistant Examiner* — Hilary L Johns
(74) *Attorney, Agent, or Firm* — Michael Best & Friedrich, LLP

(57) ABSTRACT

A motor drive apparatus of an electric forklift includes first and second torque command value generation units that individually generate a torque command value indicating torque of a corresponding traveling motor in response to a gap between a speed command value and a speed detection value; and first and second slip detectors that individually generate a slip ratio estimation value showing a slip state of a corresponding drive wheel based on the speed detection value and the torque command value. The slip detectors individually have a first arithmetic unit which generates an inertial force estimation value proportional to a differential value of the speed detection value of the corresponding traveling motor and a second arithmetic unit which generates the slip ratio estimation value in response to a relationship between the corresponding inertial force estimation value and the torque command value of the corresponding traveling motor.

19 Claims, 8 Drawing Sheets

(56) References Cited

U.S. PATENT DOCUMENTS

| | | |
|---|---|---|
| 8,335,625 B2 * | 12/2012 | Yamaguchi et al. ............ 701/82 |
| 2003/0171869 A1 * | 9/2003 | Potter et al. .................... 701/84 |
| 2004/0176899 A1 * | 9/2004 | Hallowell ....................... 701/84 |
| 2005/0080547 A1 * | 4/2005 | Scelers et al. .................. 701/82 |
| 2006/0237244 A1 * | 10/2006 | Hommi ....................... 180/65.2 |
| 2008/0234911 A1 * | 9/2008 | Matsuno et al. ................ 701/82 |
| 2009/0101428 A1 * | 4/2009 | Itoh ............................... 180/197 |
| 2009/0210128 A1 * | 8/2009 | Fujimoto et al. ............... 701/84 |
| 2010/0094495 A1 * | 4/2010 | Fujimoto et al. ............... 701/22 |
| 2011/0288702 A1 * | 11/2011 | Falkestein ...................... 701/22 |
| 2013/0345917 A1 | 12/2013 | Ozaki |

\* cited by examiner

MOTOR DRIVE APPARATUS FOR ELECTRIC FORKLIFT AND ELECTRIC FORKLIFT ADOPTING THE SAME

INCORPORATION BY REFERENCE

Priority is claimed to Japanese Patent Application No. 2013-028148, filed Feb. 15, 2013, the entire content of which is incorporated herein by reference.

BACKGROUND

1. Technical Field

The present invention relates to a motor drive apparatus for an electric forklift.

2. Description of the Related Art

As an industrial vehicle, there is an electric forklift having a battery as a source of power. The electric forklift (hereinafter, may simply be referred to as forklift) includes a traveling motor transmitting the power to front wheels which are traveling wheels (drive wheels), a hydraulic actuator motor (steering motor) transmitting the power to a hydraulic pump that controls a turning angle (steering angle) of rear wheels which are turning wheels, a hydraulic actuator motor (cargo-handling motor) transmitting the power to a hydraulic pump that controls a lifting body, and electric power conversion devices which respectively drive the traveling motor, the steering motor and the cargo-handling motor.

SUMMARY

According to an embodiment of the present invention, there is provided a motor drive apparatus of an electric forklift which is mounted on the electric forklift and controls a first traveling motor and a second traveling motor, respectively transmitting power to a left drive wheel and a right drive wheel of the electric forklift based on a speed command value showing a target speed of the electric forklift.

The motor drive apparatus includes a first torque command value generation unit and a second torque command value generation unit that are respectively provided in the first traveling motor and the second traveling motor, each of which generates a torque command value indicating torque of the corresponding traveling motor in response to a gap between a speed command value of the corresponding traveling motor and a speed detection value that is a current speed of the corresponding traveling motor; and a first slip detector and a second slip detector that are respectively provided in the first traveling motor and the second traveling motor, each of which generates a slip ratio estimation value showing a slip state of the corresponding drive wheel based on the speed detection value of the corresponding traveling motor and the torque command value of the corresponding traveling motor. Each of the first slip detector and the second slip detector includes a first arithmetic unit which generates an inertial force estimation value proportional to a differential value of the speed detection value of the corresponding traveling motor and a second arithmetic unit which generates the slip ratio estimation value in response to a relationship between the corresponding inertial force estimation value and the torque command value of the corresponding traveling motor.

According to another embodiment of the present invention, there is provided a forklift. The forklift includes a left drive wheel and a right drive wheel; a first traveling motor and a second traveling motor that respectively transmit power to the left drive wheel and the right drive wheel; and a motor drive apparatus that drives the first traveling motor and the second traveling motor.

DETAILED DESCRIPTION

Figure 1:
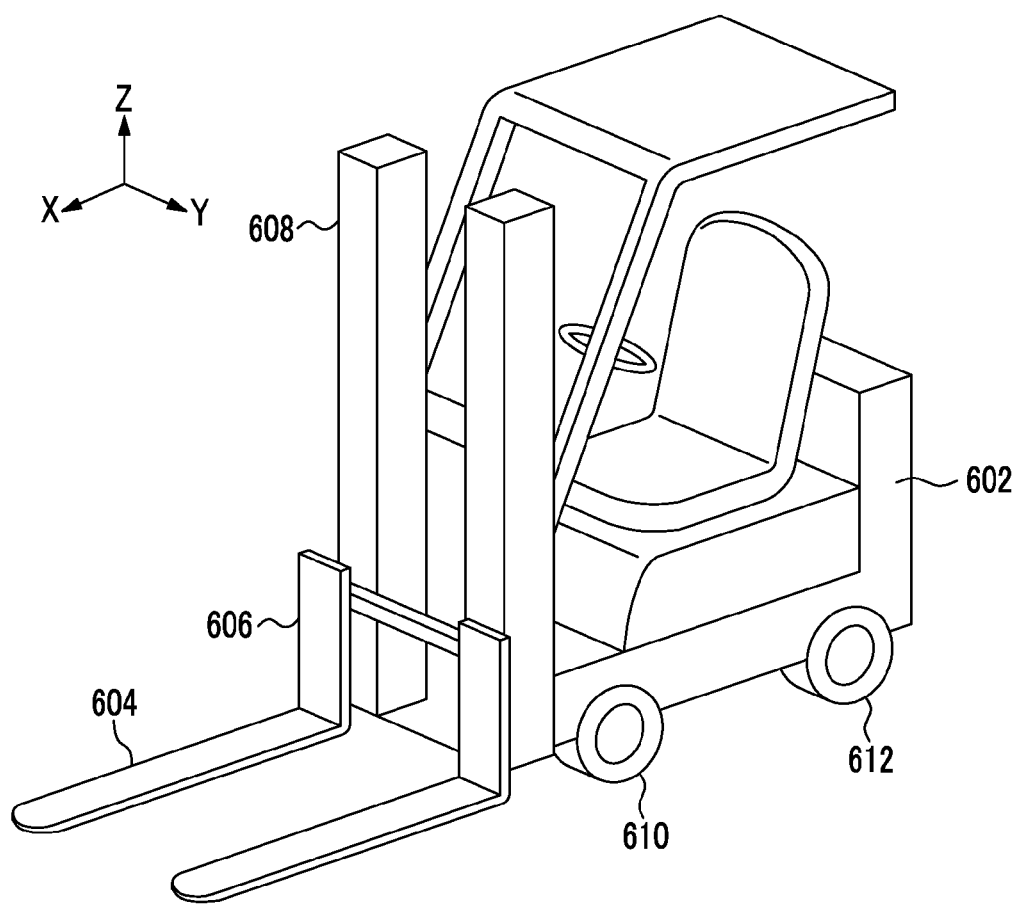
FIG. 1 is a perspective view illustrating an appearance view of a forklift.

Unlike general vehicles traveling along prearranged traffic lanes, a forklift can be often used at a large turning angle, that is, a small turning radius in a free space in many cases and can also be considered for use in fields of bad road surface conditions. Under such circumstances, the forklift may be more likely to slip compared to the general vehicles.

In the general vehicles, in order to suppress slipping, there has been proposed that a truck body speed (vehicle speed) and a wheel speed can be individually detected and compared with each other to determine whether or not the slipping is generated, thereby lowering a drive torque or changing a torque command value.

Meanwhile, a speed sensor mounted on the forklift for detecting the truck body speed causes a disadvantage of having a high cost. In addition, since the forklift often performs specialized movements such as a tight turn and circling, unlike the general vehicles, it may be considered that there is a case where the truck body speed cannot be correctly detected through the speed sensor.

A certain embodiment of the present invention is a forklift that can detect a slipping without utilizing a truck body speed.

According to the embodiment, regarding each of the left and the right drive wheels, a speed detection value which is derived from the numbers of rotations of the wheel can be differentiated, a differential value can be multiplied by wheel inertia, and thus, it is possible to estimate an inertial force torque of the wheel. The inertial force torque and a motor torque converge in a complete idling state, and the values thereof diverge in a complete adhesion state. Therefore, based on a relationship therebetween, it is possible to detect a slip state.

The second arithmetic unit may generate the slip ratio estimation value in response to a ratio of the corresponding inertial force estimation value and the corresponding torque command value of the traveling motor.

A ratio of the inertial force torque and the motor torque becomes closer to 1 in the complete idling state, the ratio thereof becomes closer to zero in the complete adhesion state, and thus, it is possible to detect the slip state by calculating the ratio thereof.

Each of the first slip detector and the second slip detector may further include a low-pass filter which receives the torque command value of the corresponding traveling motor to be output to the corresponding second arithmetic unit.

The motor drive apparatus according to a certain embodiment may further include a first slip compensator and a second slip compensator that are respectively provided in the first traveling motor and the second traveling motor, each of which corrects the torque command value of the corresponding traveling motor based on a torque compensation rate depending on the corresponding slip ratio estimation value.

A corrected torque command value of the corresponding traveling motor may be input into each of the first slip detector and the second slip detector.

According to the embodiment, it is possible to settle the slip state in response to the slip ratio estimation value detected by the first slip detector and the second slip detector.

The second arithmetic unit may convert a slip ratio estimation value *κ into a torque compensation rate $\alpha_{TRQ}$ with a value between zero and 1 and output the same. When $K_{slip}$ is a constant of $0<K_{slip}<1$, each of the first slip compensator and the second slip compensator may cause an absolute value of the torque command value of the corresponding traveling motor to be multiplied by $(1-K_{slip} \times \alpha_{TRQ})$.

The second arithmetic unit may set the torque compensation rate $\alpha_{TRQ}$ to zero when an absolute value of the slip ratio estimation value is less than a predetermined first threshold value, may set the torque compensation rate $\alpha_{TRQ}$ to 1 when the absolute value of the slip ratio estimation value is greater than a predetermined second threshold value, and may set the torque compensation rate $\alpha_{TRQ}$ to a value between zero and 1 when the absolute value of the slip ratio estimation value is greater than the first threshold value and less than the second threshold value.

The second arithmetic unit may linearly change the torque compensation rate $\alpha_{TRQ}$ with respect to the absolute value of the slip ratio estimation value when the absolute value of the slip ratio estimation value is greater than the first threshold value and less than the second threshold value.

Accordingly, it is possible to provide a deadband.

The motor drive apparatus according to a certain embodiment may further include a first torque limiter and a second torque limiter that are respectively provided in the first traveling motor and the second traveling motor, each of which limits the torque command value of the corresponding traveling motor to be equal to or below an upper limit value which is determined in response to the speed detection value of the corresponding traveling motor and a predetermined torque limit curve.

Each of a first slip compensator and a second slip compensator may be respectively provided in a latter stage of the first torque limiter and the second torque limiter.

An arbitrary combination of the above-described configuration elements and the configuration element or expression of the embodiment of the invention which are mutually replaced between methods, apparatuses, and systems are also effective as an embodiment of the present invention.

Hereinafter, suitable embodiments of the present invention will be described with reference to the drawings. The same reference numeral is applied to the same or equivalent configuration element, member, or processing illustrated in each drawing. Overlapping descriptions will not be repeated, as appropriate. In addition, the embodiments are just examples not limiting the invention, and all the characteristics and combinations thereof described in the embodiments are not necessarily essential to the invention.

Hereinafter, descriptions will be given based on an application in which the embodiments of the invention are mostly effective of a forklift in which motors are independently provided for left and right wheels to be driven.

In this specification, the term "state where a member A is connected to a member B" includes a case where the member A and the member B are physically and directly connected with each other and also includes a case where the member A and the member B are indirectly connected with each other through another member while not substantially influencing the electrical connection state therebetween or not impairing a function and an effect performed by bonding therebetween.

Similarly, the term "state where a member C is provided between a member A and a member B" includes a case where the member A and the member C, or the member B and the member C are directly connected with each other and also includes a case of being indirectly connected with each other through another member while not substantially influencing the electrical connection state therebetween or not impairing the function and the effect performed by the bonding therebetween.

FIG. 1 is a perspective view illustrating an appearance view of the forklift. A forklift 600 includes a truck body (chassis) 602, a fork 604, a lifting body (lift) 606, a mast 608 and wheels 610 and 612. The mast 608 is provided in front of the truck body 602. The lifting body 606 is driven by a power source such as a hydraulic actuator (not illustrated in FIG. 1, illustrated by reference numeral 116 in FIG. 3) and moves up and down along the mast 608. The fork 604 for supporting cargo is attached to the lifting body 606.

Figure 2:
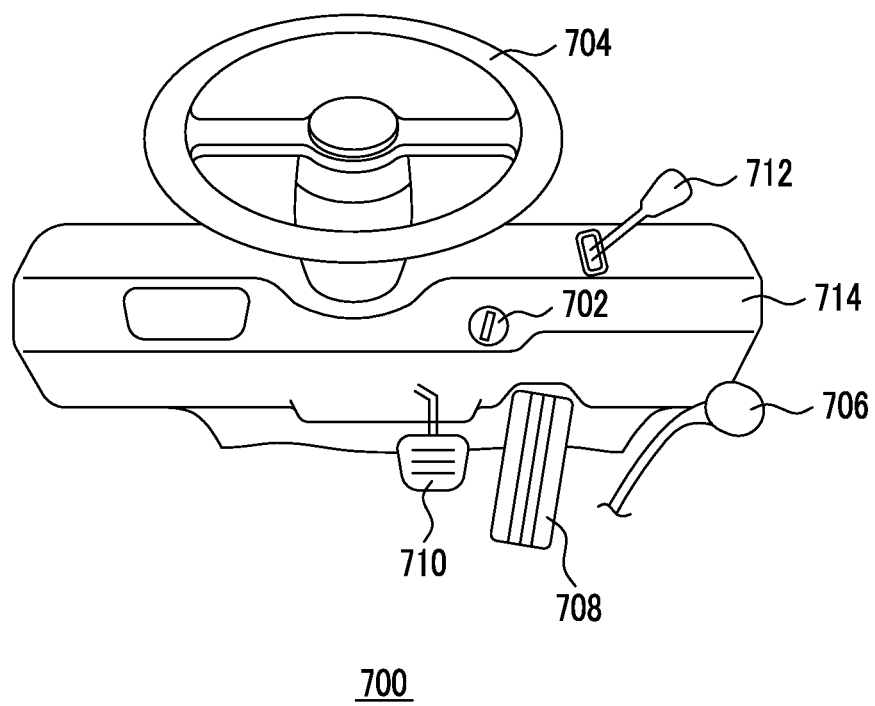
FIG. 2 is a view illustrating an example of an operation panel of the forklift.

FIG. 2 is a view illustrating an example of an operation panel 700 of the forklift. The operation panel 700 includes an ignition switch 702, a steering wheel 704, a lift lever 706, an accelerator pedal 708, a brake pedal 710, a dashboard 714 and a forward-reverse lever 712.

The ignition switch 702 is a starting switch for the forklift 600. The steering wheel 704 is an operation means for steering the forklift 600. The lift lever 706 is an operation means for moving the lifting body 606 up and down. The accelerator pedal 708 is an operation means controlling rotations of the traveling wheel, and traveling of the forklift 600 is controlled by a user adjusting an amount of depressing an accelerator. If the user depresses the brake pedal 710, the brake is applied. The forward-reverse lever 712 is a lever to switch a traveling direction of the forklift 600 between forward and reverse movements.

Figure 3:
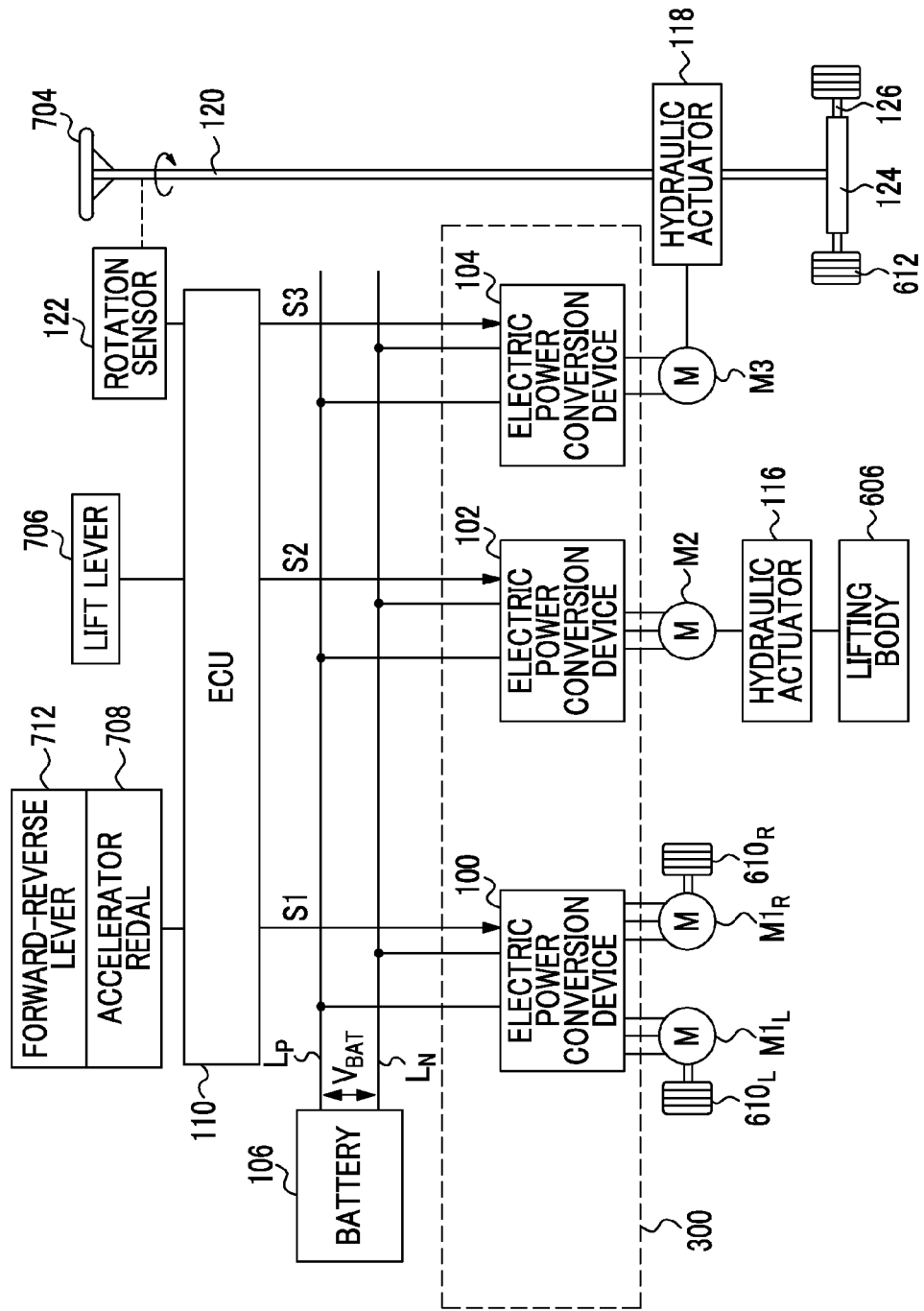
FIG. 3 is a block diagram illustrating a configuration of an electrical system and a machine system of the dual motor-type forklift.

Subsequently, a configuration of the forklift 600 will be separately described regarding traveling, cargo-handling and steering. FIG. 3 is a block diagram illustrating a configuration of an electrical system and a machine system of the dual motor-type forklift 600. A controller 110 is a processor for controlling the forklift 600 in its entirety.

A battery 106 outputs battery voltage $V_{BAT}$ between a line P and a line N.

A first electric power conversion device 100, a second electric power conversion device 102 and a third electric power conversion device 104 configure a motor drive apparatus 300. The motor drive apparatus 300 drives each of a traveling motor M1L and M1R, a cargo-handling motor M2 and a steering motor M3 based on a first control command value S1 to a third control command value S3 from the controller 110. The first electric power conversion device 100, the second electric power conversion device 102 and the third electric power conversion device 104 individually receive the battery voltage $V_{BAT}$, convert the voltage into a three-phase alternating current signal, and supply the voltage to the corresponding motor M1L, M1R, M2 or M3.

Traveling

The controller 110 receives a signal commanding the forward and reverse movements from the forward-reverse lever 712 and a signal commanding an amount of a traveling operation in response to the amount of depressing an accelerator from the accelerator pedal 708, and the controller 110 outputs the first control command value S1 in response thereto to the first electric power conversion device 100. The first electric power conversion device 100 controls electric power which is supplied to each of the first traveling motor (left traveling motor) M1L and the second traveling motor (right traveling motor) M1R in response to the first control command value S1. The first control command value S1 correlates with a speed command value commanding a target speed of the traveling motor M1. A left front wheel which is the drive wheel (left drive wheel) 610L rotates by the power of the first traveling motor M1L, and a right front wheel (right drive wheel) 610R rotates by the power of the second traveling motor M1R.

Cargo-Handling

The lift lever 706 is tilted to control upward and downward movements of the lifting body 606. The controller 110 detects the tilt of the lift lever 706 and in response to the tilt, outputs to the second electric power conversion device 102 a second control command value S2 showing an amount of a cargo-handling operation. The second electric power conversion device 102 supplies the electric power in response to the second control command value S2 to the cargo-handling motor M2, thereby controlling revolutions thereof. The lifting body 606 is linked to the hydraulic actuator 116. The hydraulic actuator 116 converts the revolution movements generated by the cargo-handling motor M2 into linear movements, thereby controlling the lifting body 606.

Steering

A rotation sensor 122 detects a rotational angle of the steering wheel 704 and outputs a signal showing the rotational angle to the controller 110. The controller 110 outputs the third control command value S3 in response to the rotational angle to the third electric power conversion device 104. The third electric power conversion device 104 controls the steering motor M3 in response to the third control command value S3. The steering is controlled through the hydraulic actuator 118 by the revolution movements of the steering motor M3.

Figure 4:
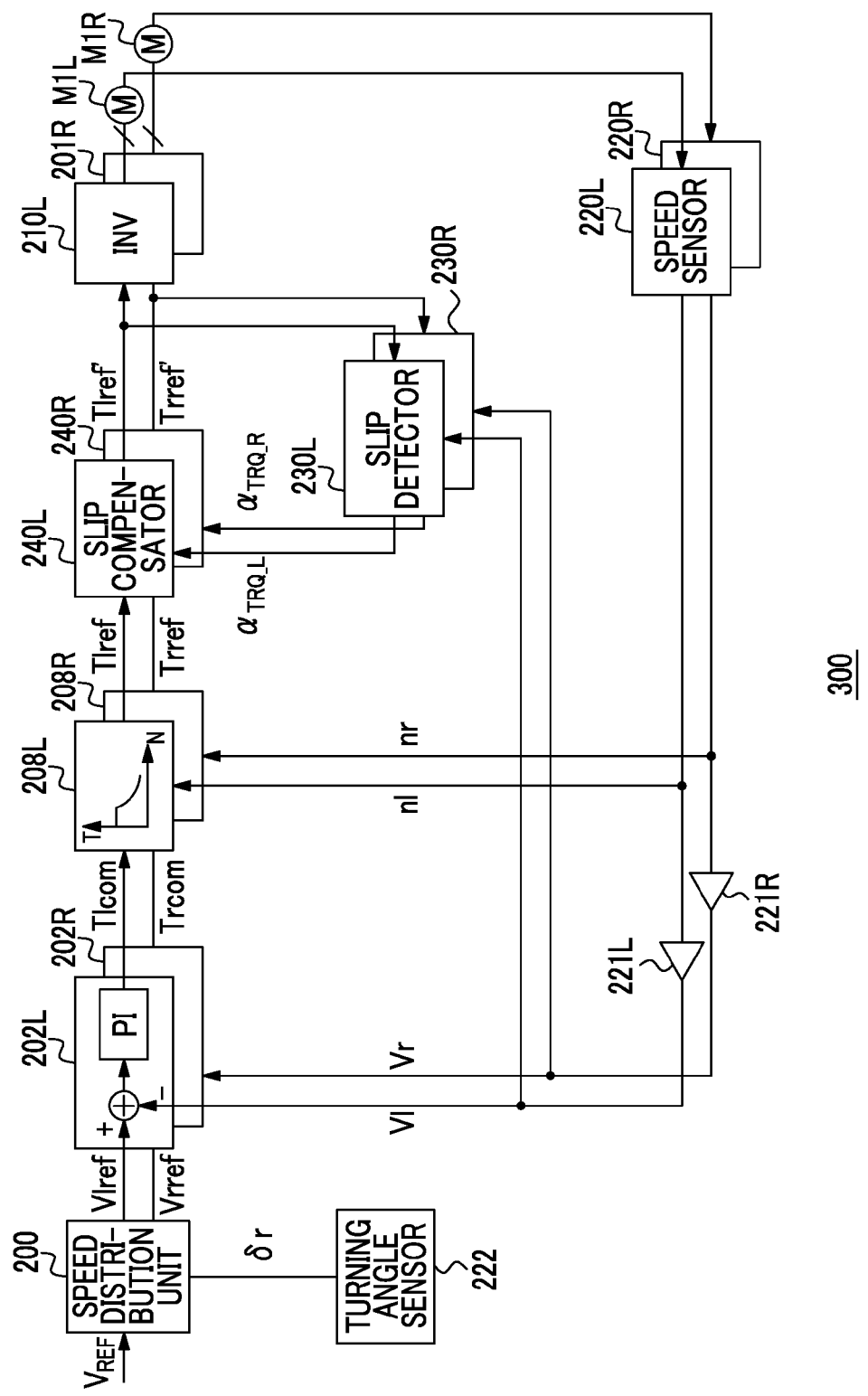
FIG. 4 is a block diagram illustrating a configuration of a motor drive apparatus (first electric power conversion device) according to an embodiment.

FIG. 4 is a block diagram illustrating a configuration of the motor drive apparatus 300 (first electric power conversion device 100) according to the embodiment. The motor drive apparatus 300 includes a speed distribution unit 200, a torque command value generation unit 202, a torque limiter 208, an inverter 210, a slip detector 230, a slip compensator 240, a speed sensor 220, a converter 221 of the numbers of rotations/speed (n/V) and a turning angle sensor 222.

A first speed sensor 220L and a second speed sensor 220R respectively detect revolution speeds nl and nr of the first traveling motor M1L and the second traveling motor M1R. n/V converters 221L and 221R multiply the rotation speeds nl and nr by a coefficient in response to a circumference of a tire and a speed reduction gear ratio, thereby calculating a wheel speed (left speed detection value) Vl of the left drive wheel 610L and a wheel speed (right speed detection value) Vr of the right drive wheel 610R. The turning angle sensor 222 detects a turning angle δr.

The speed distribution unit 200 receives a speed command value Vref in response to an amount of an acceleration operation. The speed distribution unit 200 calculates a left speed command value Vlref which is a target speed of the first traveling motor M1L and a right speed command value Vrref which is a target speed of the second traveling motor M1R in response to the current turning angle δr.

The speed distribution unit 200 may adopt a known technology.

A driving unit of the first traveling motor M1L and a driving unit of the second traveling motor M1R are configured to be identical to each other in the motor drive apparatus 300.

A first torque command value generation unit 202L and a second torque command value generation unit 202R are respectively provided in the first traveling motor M1L and the second traveling motor M1R. The first torque command value generation unit 202L (second torque command value generation unit 202R) generates a torque command value Tlcom (Trcom) commanding a torque of the corresponding traveling motor M1L (M1R) in response to a gap between the speed command value Vlref (Vrref) of the corresponding traveling motor M1L (M1R) and the current speed Vl (Vr) of the corresponding traveling motor M1L (M1R).

The first torque command value generation unit 202L includes a subtractor 204L which generates a gap between the left speed command value Vlref and the left speed detection value Vl and also includes a PI control unit 206L which performs a PI (proportion and integral) control of the gap and generates a left torque command value Tlcom. The second torque command value generation unit 202R of the right wheel generating a right torque command value Trcom has the same configuration.

A method of calculating the left and the right torque command values Tlcom and Trcom is not limited to that of FIG. 4, and thus, another method which is already known or expected to be utilized in the future may be adopted.

A first torque limiter 208L and a second torque limiter 208R are respectively provided in the first traveling motor M1L and the second traveling motor M1R. In the torque limiter 208, a torque limit curve Tlim (n) which regulates an upper limit value Tlim of the torque command values Tlcom and Trcom is defined as a function of a speed n of the motor.

The first torque limiter 208L (second torque limiter 208R) limits the torque command value Tlcom (Trcom) of the corresponding traveling motor M1L (M1R) to be equal to or below an upper limit value Tllim (Trlim) which is determined in response to a speed detection value nl (nr) of the corresponding traveling motor M1L (M1R) and a predetermined torque limit curve Tlim (n).

A first slip detector 230L and a second slip detector 230R are respectively provided in the first traveling motor M1L and the second traveling motor M1R.

The first slip detector 230L (second slip detector 230R) generates a slip ratio estimation value *Kl (*Kr) showing a slip state of the corresponding drive wheel based on the speed detection value Vl (Vr) of the corresponding traveling motor M1L (M1R) and the torque command value Tlref (Trref) of the corresponding traveling motor M1L (M1R).

A first slip compensator 240L and a second slip compensator 240R are respectively provided in the first traveling motor M1L and the second traveling motor M1R. The first slip compensator 240L (second slip compensator 240R) corrects the torque command value Tlref (Trref) of the corresponding traveling motor M1L (M1R) based on a torque compensation rate $\alpha_{TRQ\_L}$ ($\alpha_{TRQ\_R}$) in response to the corresponding slip ratio estimation value *Kl (*Kr).

A corrected torque command value Tlref' (Trref') of the corresponding traveling motor M1L (M1R) is input into the first slip detector 230L (second slip detector 230R).

Figure 5:
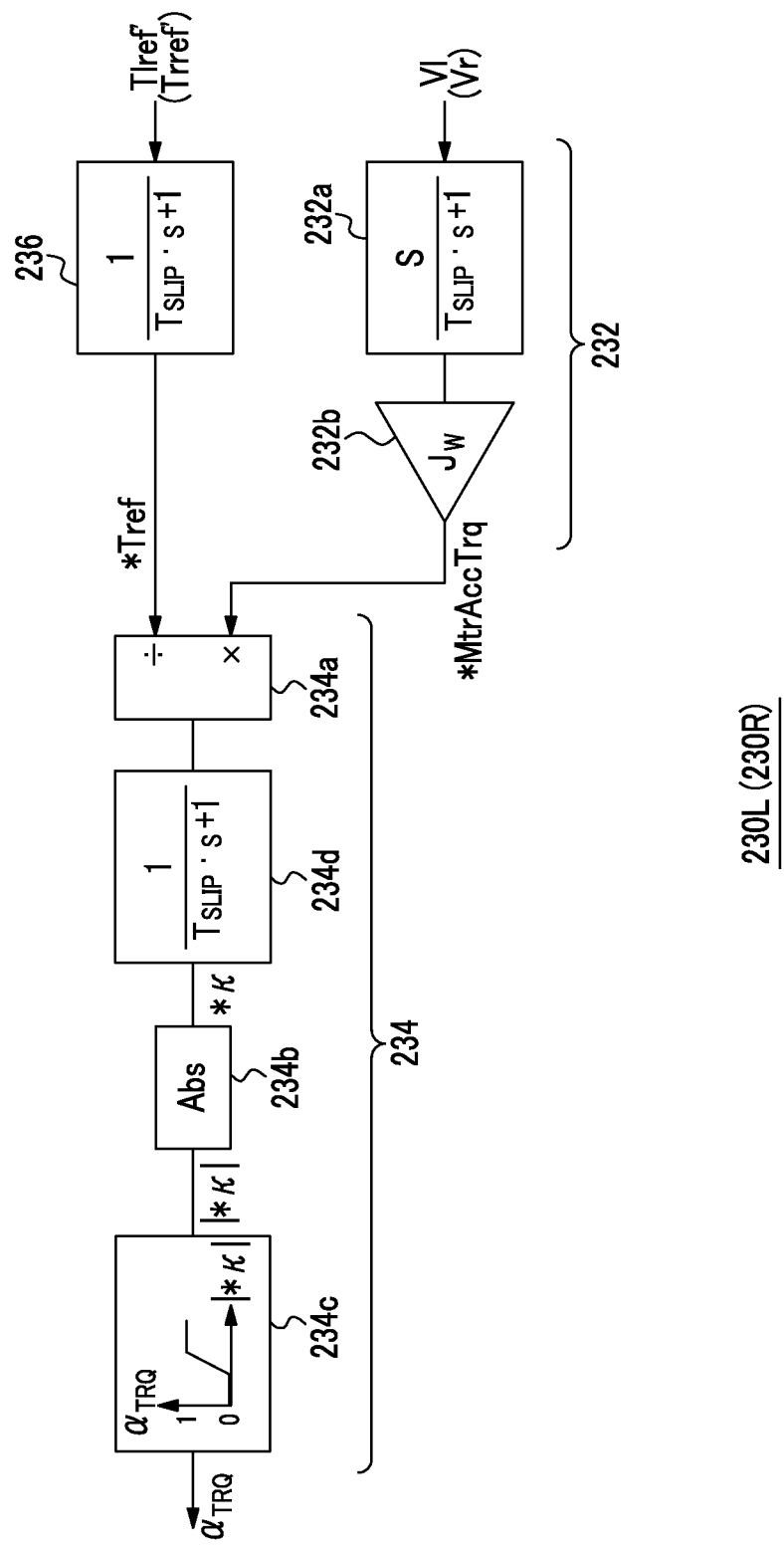
FIG. 5 is a block diagram illustrating a configuration example of a slip detector.

FIG. 5 is a block diagram illustrating a configuration example of the slip detector 230. The first slip detector 230L and the second slip detector 230R are configured to be identical to each other.

The first slip detector 230L includes a first arithmetic unit 232, a second arithmetic unit 234 and a low-pass filter 236. The first arithmetic unit 232 generates an inertial force estimation value *MtrAccTrq [Nm] proportional to a differential value of the speed detection value Vl of the corresponding traveling motor M1L. Specifically, the first arithmetic unit 232 includes a differentiator 232a and a multiplier 232b. The first arithmetic unit 232 is a first-stage high-pass filter differentiating the speed detection value Vl for example, and a transmission function H (s) thereof is $$H(s)=s/(T_{SLIP}\times s+1).$$

$T_{SLIP}$ is a predetermined time constant [sec].

The multiplier 232b multiplies an output value from the differentiator 232a by a coefficient Jw. Jw is wheel inertia [kgm$^2$].

The low-pass filter 236 receives the torque command value Tlref' of the corresponding traveling motor M1L, and outputs the same to the corresponding second arithmetic unit 234. It is possible to reduce influence of noise by providing the low-pass filter 236.

For example, the low-pass filter 236 is a first-stage low-pass filter, and the transmission function H (s) thereof is, $$H(s)=1/(T_{SLIP}\times s+1).$$

A torque command value *Tref passing through the low-pass filter 236 is input into the second arithmetic unit 234.

The second arithmetic unit 234 generates a slip ratio estimation value *κl in response to a ratio of the corresponding inertial force estimation value *MtrAccTrq and the torque command value *Tref of the corresponding traveling motor. The second arithmetic unit 234 includes a divider 234a, an absolute value circuit 234b, a limiter 234c and a low-pass filter 234d.

The divider 234a generates the slip ratio estimation value *κ by the following expression.

$$*\kappa l = *MtrAccTrq/*Tref$$

The low-pass filter 234d is provided in a latter stage of the divider 234a.

In the embodiment, the second arithmetic unit 234 converts the slip ratio estimation value *κ into the torque compensation rate $\alpha_{TRQ}$ with a value between zero and 1 and outputs the same. For example, the absolute value circuit 234b generates an absolute value |*κ| of the slip ratio estimation value *κ. The limiter 234c includes a table or a relational expression showing a relationship between the absolute value |*κ| and the torque compensation rate $\alpha_{TRQ}$.

Figure 6:
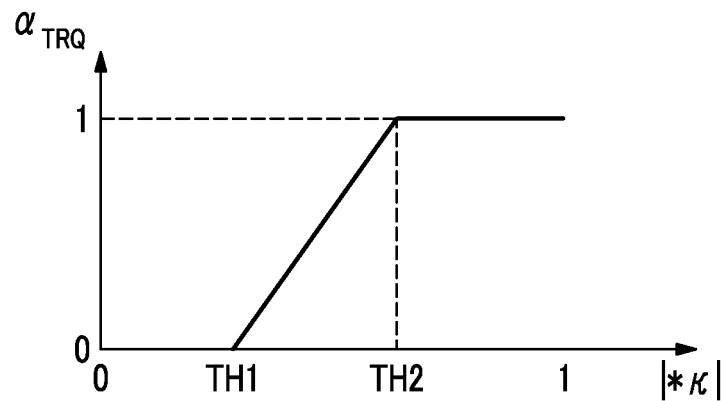
FIG. 6 is a view illustrating an example of a relationship between absolute value $|I^*\kappa|$ of a slip ratio estimation value and torque compensation rate $\alpha_{TRQ}$.

FIG. 6 is a view illustrating an example of a relationship between the absolute value |*κ| of a slip ratio estimation value and torque compensation rate $\alpha_{TRQ}$.

The limiter 234c of the second arithmetic unit 234 may set the torque compensation rate $\alpha_{TRQ}$ to zero when the absolute value |*K| of the slip ratio estimation value is less than a predetermined first threshold value TH1, set the torque compensation rate $\alpha_{TRQ}$ to 1 when the absolute value |*κ| of the slip ratio estimation value is greater than a predetermined second threshold value TH2, and set the torque compensation rate $\alpha_{TRQ}$ to a value between zero and 1 when the absolute value |*κ| of the slip ratio estimation value is greater than the first threshold value TH1 and less than the second threshold value TH2.

The limiter 234c may linearly change the torque compensation rate $\alpha_{TRQ}$ with respect to the absolute value |*κ| of the slip ratio estimation value when the absolute value |*κ| of the slip ratio estimation value is greater than the first threshold value TH1 and less than the second threshold value TH2.

It is possible to set an upper limit to an amount of compensation of the torque in the slip compensator 240 by providing the limiter 234c, and it is also possible to provide a deadband.

Returning to FIG. 4, the first slip compensator 240L and the second slip compensator 240R respectively correct the torque command values Tlref and Trref according to the following expressions.

$$Tlref'=\text{sign}(Tlref)\times\{1-K_{slip}\times\alpha_{TRQ\_L}\}$$

$$Trref'=\text{sign}(Trref)\times\{1-K_{slip}\times\alpha_{TRQ\_R}\}$$

However, $K_{slip}$ is a constant of $0<K_{slip}<1$. Sign (X) is an operator indicating a code X.

$$\text{sign}(X)=1\ (X>0)$$

$$\text{sign}(X)=-1\ (X<0)$$

That is, the first slip compensator 240L (second slip compensator 240R) multiplies the absolute value thereof by $(1-K_{slip}\times\alpha_{TRQ})$ as it maintains a code of the torque command value of the corresponding traveling motor M1L (M1R).

Figure 7:
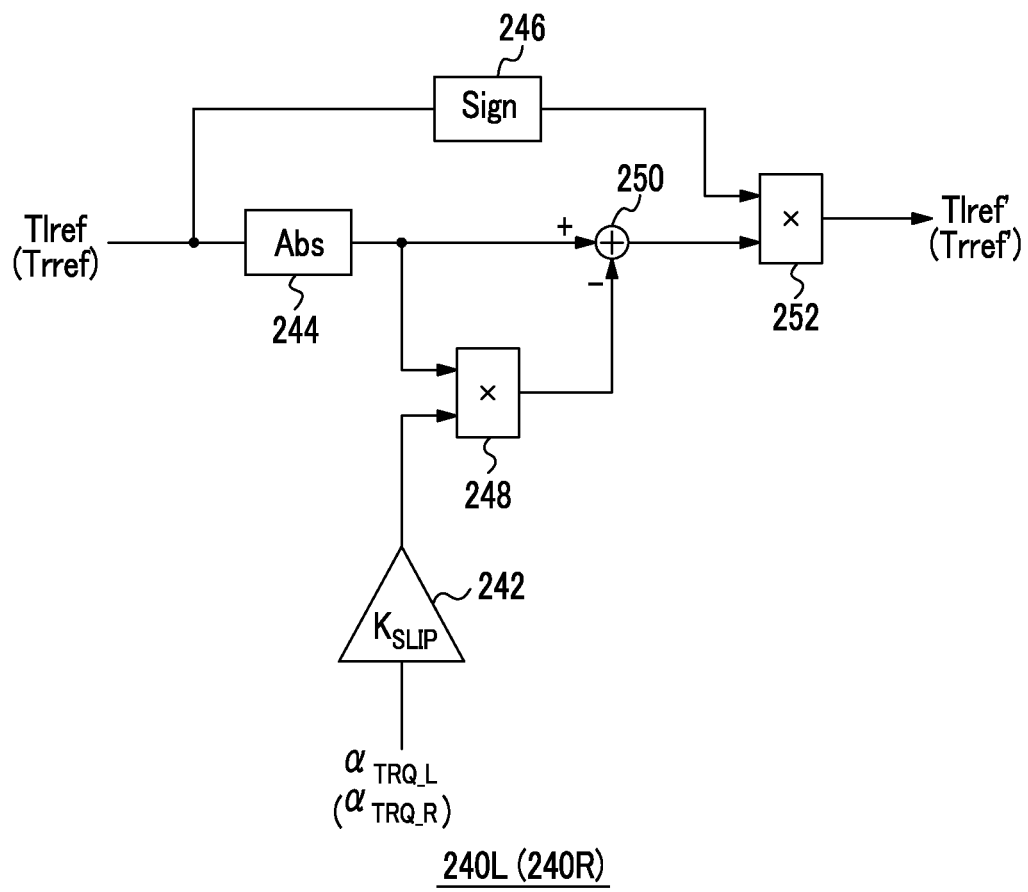
FIG. 7 is a block diagram illustrating a configuration example of a slip compensator.

FIG. 7 is a block diagram illustrating a configuration example of the slip compensator 240. The first slip compensator 240L and the second slip compensator 240R are configured to be identical to each other.

A multiplier 242 multiplies the torque compensation rate $\alpha_{TRQ}$ by the coefficient $K_{slip}$. An absolute value circuit 244 generates an absolute value |Tlref| of the torque command value Tlref. An encoder 246 generates the code sign (Tlref) of the torque command value Tlref. A multiplier 248 multiplies an output of the absolute value circuit 244 and an output of the multiplier 242. A subtractor 250 subtracts the output of the multiplier 248 from the output of the absolute value circuit 244. A multiplier 252 multiplies an output of the encoder 246 and an output of the subtractor 250, thereby generating the corrected torque command value Tlref'.

According to those skilled in the art, the configuration of the slip compensator 240 is not limited to that of FIG. 7. It is understood that there exists another modification example resulting in the same, and thus, such a modification example is included within the scope of the embodiment of the invention.

Returning to FIG. 4, a first inverter 210L and a second inverter 210R are respectively provided in the first traveling motor M1L and the second traveling motor M1R. The first inverter 210L (second inverter 210R) drives the corresponding traveling motor M1L (M1R) based on the torque command value Tlref' (Trref') from the corresponding first slip compensator 240L (second slip compensator 240R).

Thus far, the configuration of the motor drive apparatus 300 has been described. Subsequently, a principle thereof will be described.

It is assumed that a truck is symmetrical in a lateral direction and is considered to be in a state of moving straight ahead. When a wheel inertia including one traveling motor and a drive wheel is Jw [kgm$^2$], a weight of the truck is M [kg], motor torque is Tm [Nm], a truck drive reaction torque is Td [Nm], a wheel speed is $\omega_w$ [m/sec], a truck body speed is v [m/sec], a speed reduction ratio is n, and an effective diameter of a tire is r [m], an equation for a truck movement is provided as follows. However, the character l is appended to indicate a left side and the character r is appended to indicate a right side. In addition, the apostrophe """ indicates time differential.

$$J_{wr} \times \omega_{wr}' = T_{mr} - T_{dr}$$

$$J_{wl} \times \omega_{wl}' = T_{ml} - T_{dl}$$

$$M \times v' = (T_{dr} + T_{dl}) \times n/r$$

When a tire is in a complete idling state by a slipping, the following expression is realized.

$$T_{dr} = 0, T_{dl} = 0$$

$$J_{wr} \times \omega_{wr}' = T_{mr}$$

$$J_{wl} \times \omega_{wl}' = T_{ml}$$

$$M \times v' = 0$$

When a ratio of an inertial force torque of a traveling motor and a motor torque is 1, it is in the complete idling state. As the values therein are closer to each other, in other words, as the ratio thereof is closer to 1, it is possible to regard the state being closer to a slipping. Accordingly, the inertial force torque is estimated from the wheel speed, and thus, it is possible to detect the slip state (estimated slip ratio *κ) by acquiring a relationship between the inertial force torque and the motor torque (ratio thereof in the embodiment). The slip detectors 230L and 230R in FIG. 4 are capable of calculating the estimated slip ratio *κ based on this principle.

In addition, when a tire is in a complete adhesion state, an equation for a movement is provided as follows.

$$r/n \times \omega_{wr} = r/n \times \omega_{wl} = v$$

$$\{J_{wr} + M/2 \times (r/n)^2\} \omega_{wr}' = T_{mr}$$

$$\{J_{wl} + M/2 \times (r/n)^2\} \omega_{wl}' = T_{ml}$$

In the complete adhesion state, the inertia becomes large when it is viewed from a motor control system compared to the complete idling state. In other words, in a complete slip state, the inertia of the motor speed control system becomes small, and thus, it is possible to regard control system loop gain as being in an excessive state. Therefore, it is possible to obtain the same response as in a non-slip state by causing the control system loop gain to be smaller as the slip state becomes closer to the complete idling state (as slippage becomes greater).

In the slip compensators 240L and 240R of FIG. 4, it is possible to realize the same state as the non-slip state in the slip state thereof based on this principle.

Thus far, the principle of the motor drive apparatus 300 has been described. Subsequently, an operation thereof will be described.

In order to verify effectiveness of the motor drive apparatus 300, a switchback is performed in an individual state where the left drive wheel is in contact with a low-friction road surface (non-load) so as to easily slip and the right drive wheel is in a grip state with respect to the road surface. The switchback denotes an operation in which a gear is shifted into a reverse mode, and then, the gear is switched into a drive mode from a state where an acceleration pedal is fully depressed.

Figure 8:
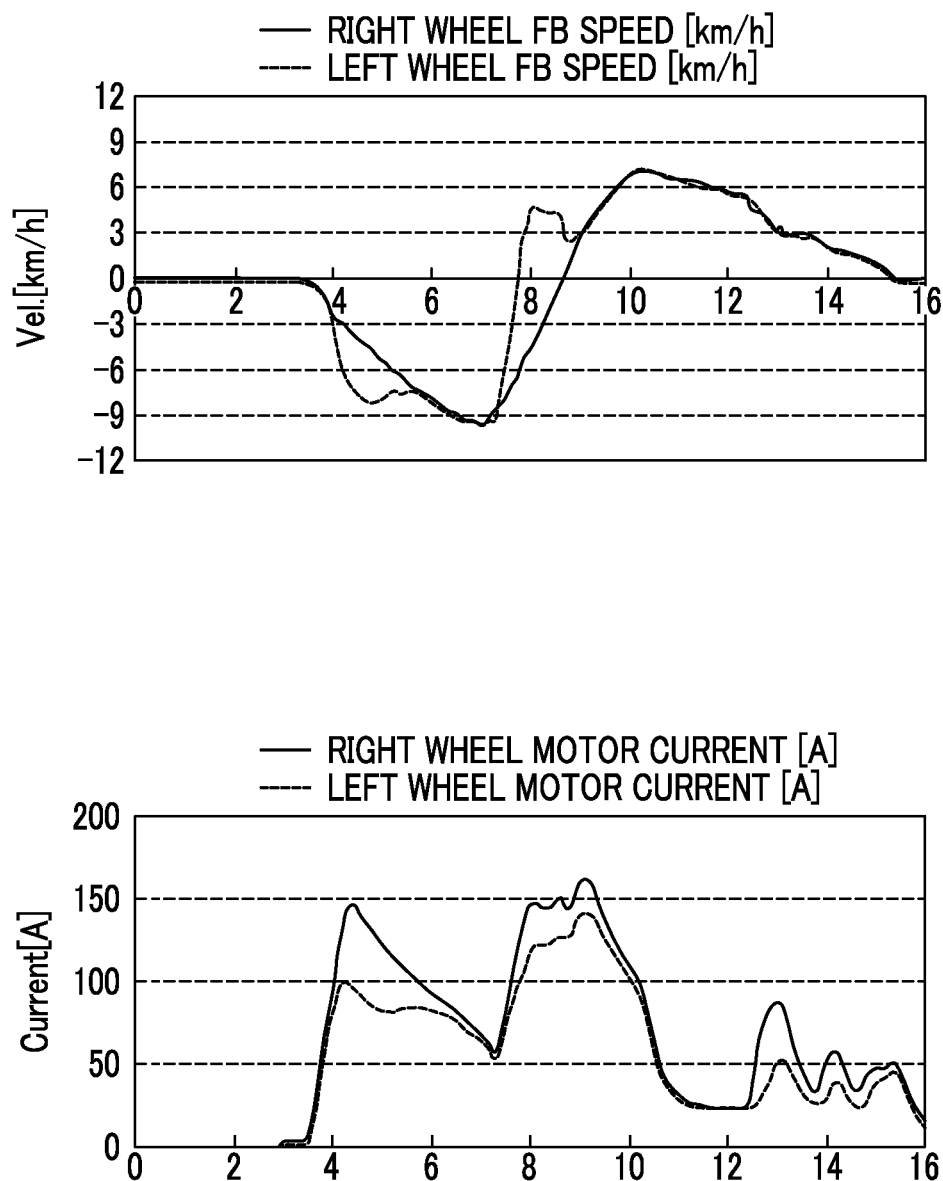
FIG. 8 is a waveform chart when a slip control is not performed in the motor drive apparatus of FIG. 4.
Figure 9:
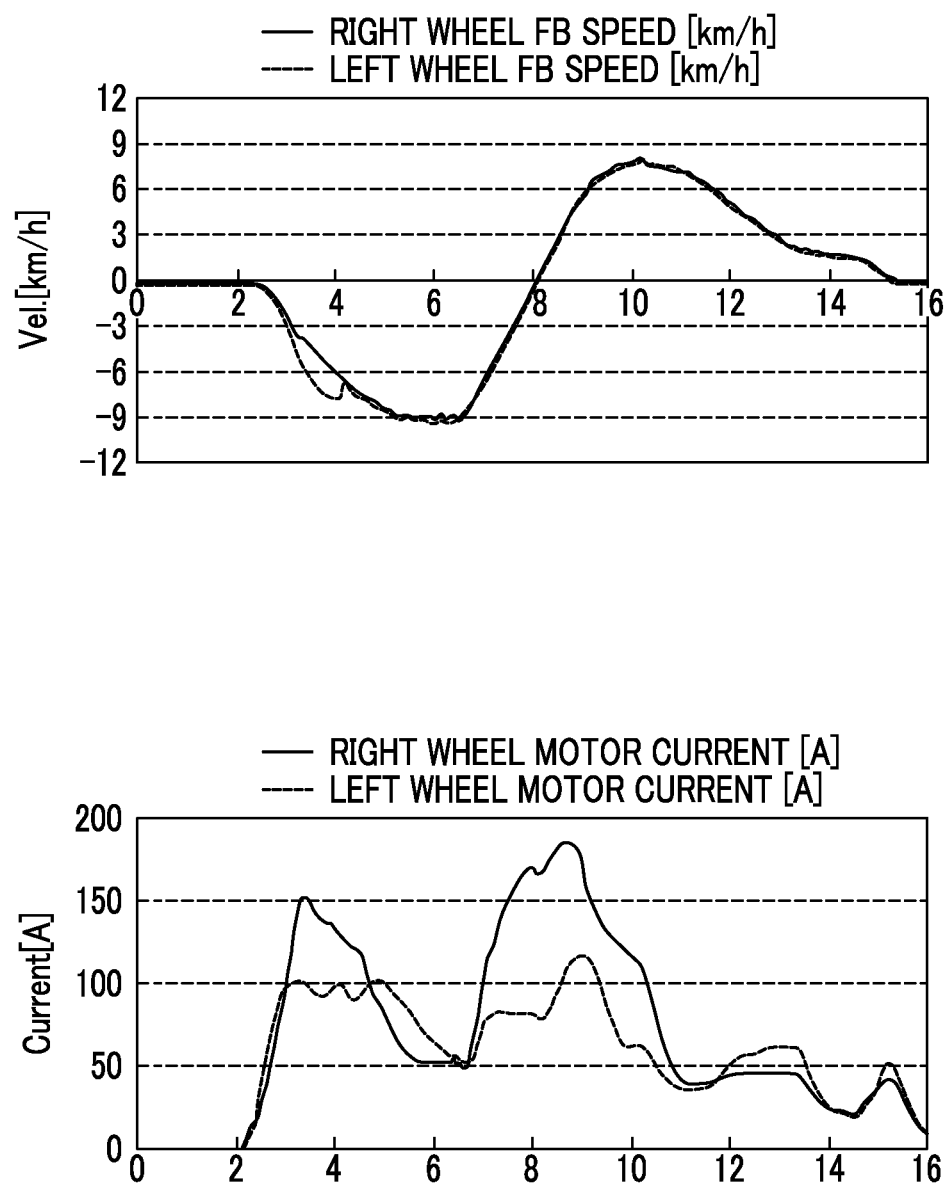
FIG. 9 is a waveform chart when the slip control is performed in the motor drive apparatus of FIG. 4.

FIG. 8 is a waveform chart when a slip control is not performed in the motor drive apparatus 300 of FIG. 4. FIG. 9 is a waveform chart when the slip control is performed in the motor drive apparatus 300 of FIG. 4. Each of FIGS. 8 and 9 illustrate the left and the right speed detection values Vl and Vr, and drive currents of the left and the right traveling motors in a descending order.

As illustrated in FIG. 8, when the slip control is not performed, that is, when torque compensation is not performed by the slip compensator 240 of FIG. 4, since only the left drive wheel slips, the absolute value of the speed detection value thereof becomes greater compared to that of the right drive wheel. In addition, since a reaction force is small in only the left drive wheel, the drive current of the first traveling motor M1L becomes smaller compared to that of the second traveling motor M1R.

Referring to FIG. 9, the slip control allows the drive current to be reduced so as to cause the torque to be small with respect to the left drive wheel in the slip state. Accordingly, it is possible to cause the speed detection value of the left and the right drive wheel to be substantially identical to each other.

Additionally, as illustrated in FIG. 9, the state in which the slip control is properly operated by the slip compensator 240 denotes that an estimation of the slip state is properly performed by the slip detector 230.

In this manner, according to the motor drive apparatus 300 of the embodiment, it is possible to properly detect the slip state without mounting the speed sensor detecting the speed v of the truck body. In addition, it is possible to perform the slip control by utilizing the detection result.

In addition, in the motor drive apparatus 300 of the embodiment, when performing the detection of the slip state or the slip control, there is no need for the weight M [kg] of the truck, but the wheel inertia Jw is needed. Although the weight M of the truck changes in response to a live load of the forklift, the wheel inertial Jw is substantially constant without being influenced by the live load. Therefore, there is no need for a weight sensor.

Hereinbefore, the description has been made with reference to the embodiment of the present invention. The embodiment is merely an example, and it is understood by those skilled in the related art that various modification examples can be made in combinations of each of the configuration elements and the processing procedures thereof and those modification examples are also included within the scope of the embodiment of the invention. Hereinafter, those modification examples will be described.

Modification Example 1

Although a case in which the slip control is performed by correcting the torque using the slip compensator 240 is described in the embodiment, the embodiment of the invention is not limited thereto. For example, the slip state may be detected by the slip detector 230 and a user notified of the result thereof. In this case, the slip compensator 240 may be omitted, and the torque command value Tlref (Trref) from the torque limiter 208L (208R) may be input into the first slip detector 230L (second slip detector 230R)

Modification Example 2

Although the torque compensation is performed in the latter stage of the torque limiter 208 in the embodiment, the embodiment of the invention is not limited thereto. The slip compensator 240 may be disposed in another location, for example, in a former stage of the torque limiter 208.

Modification Example 3

Although a case in which the slip ratio estimation value is calculated based on a value of a ratio of the inertial force estimation value and the torque command value (=inertial force estimation value/torque command value) is described in the embodiment, a value of a ratio of the torque command value and the inertial force estimation value (=torque command value/inertial force estimation value) may be calculated. Otherwise, an estimated value having a correlation with the slip state may be calculated using another arithmetic expression to replace the ratio thereof, and this case is also included within the scope of the embodiment of the invention.

Modification Example 4

The embodiment of the invention can be applied to various similar industrial vehicles without being limited to an electric forklift.

It should be understood that the invention is not limited to the above-described embodiment, but may be modified into various forms on the basis of the spirit of the invention. Additionally, the modifications are included in the scope of the invention.

What is claimed is:

1. A motor drive apparatus of an electric forklift which is mounted on the electric forklift and controls a first traveling motor and a second traveling motor, respectively transmitting power to a left drive wheel and a right drive wheel of the electric forklift based on a speed command value showing a target speed of the electric forklift, the apparatus comprising:
a first torque command value generation unit and a second torque command value generation unit that are respectively provided in the first traveling motor and the second traveling motor, each of which generates a torque command value indicating torque of the corresponding traveling motor in response to a gap between a speed command value of the corresponding traveling motor and a speed detection value that is a current speed of the corresponding traveling motor; and
a first slip detector and a second slip detector that are respectively provided in the first traveling motor and the second traveling motor, each of which generates a slip ratio estimation value showing a slip state of the corresponding drive wheel based on the speed detection value of the corresponding traveling motor and the torque command value of the corresponding traveling motor,
wherein each of the first slip detector and the second slip detector includes a first arithmetic unit which generates an inertial force estimation value proportional to a differential value of the speed detection value of the corresponding traveling motor and a second arithmetic unit which generates the slip ratio estimation value in response to a relationship between the corresponding inertial force estimation value and the torque command value of the corresponding traveling motor.

2. The motor drive apparatus of an electric forklift according to claim 1,
wherein the second arithmetic unit generates the slip ratio estimation value in response to a ratio of the corresponding inertial force estimation value and the torque command value of the corresponding traveling motor.

3. The motor drive apparatus of an electric forklift according to claim 1,
wherein each of the first slip detector and the second slip detector further includes a low-pass filter which receives the torque command value of the corresponding traveling motor to be output to the corresponding second arithmetic unit.

4. The motor drive apparatus of an electric forklift according to claim 1, further comprising:
a first slip compensator and a second slip compensator that are respectively provided in the first traveling motor and the second traveling motor, each of which corrects the torque command value of the corresponding traveling motor based on a torque compensation rate depending on the corresponding slip ratio estimation value.

5. The motor drive apparatus of an electric forklift according to claim 4,
wherein a corrected torque command value of the corresponding traveling motor is input into each of the first slip detector and the second slip detector.

6. The motor drive apparatus of an electric forklift according to claim 4,
wherein the second arithmetic unit converts the slip ratio estimation value into torque compensation rate αTRQ with a value between zero and 1 and outputs the same, and
when $K_{slip}$ is a constant of $0<K_{slip}<1$, each of the first slip compensator and the second slip compensator causes an absolute value of the torque command value of the corresponding traveling motor to be multiplied by $(1-K_{slip} \times \alpha TRQ)$.

7. The motor drive apparatus of an electric forklift according to claim 6,
wherein the second arithmetic unit sets the torque compensation rate αTRQ to zero when an absolute value of the slip ratio estimation value is less than a predetermined first threshold value, sets the torque compensation rate αTRQ to 1 when the absolute value of the slip ratio estimation value is greater than a predetermined second threshold value, and sets the torque compensation rate αTRQ to a value between zero and 1 when the absolute value of the slip ratio estimation value is greater than the first threshold value and less than the second threshold value.

8. The motor drive apparatus of an electric forklift according to claim 7,
wherein the second arithmetic unit linearly changes the torque compensation rate αTRQ with respect to the absolute value of the ratio when the absolute value of the slip ratio estimation value is greater than the first threshold value and less than the second threshold value.

9. The motor drive apparatus of an electric forklift according to claim 1, further comprising:
a first torque limiter and a second torque limiter that are respectively provided in the first traveling motor and the second traveling motor, each of which limits the torque command value of the corresponding traveling motor to be equal to or below an upper limit value which is determined in response to the speed detection value of the corresponding traveling motor and a predetermined torque limit curve.

10. The motor drive apparatus of an electric forklift according to claim 9,
wherein each of a first slip compensator and a second slip compensator are respectively provided in a latter stage of the first torque limiter and the second torque limiter.

11. An electric forklift comprising:
a left drive wheel and a right drive wheel;
a first traveling motor and a second traveling motor that respectively transmit power to the left drive wheel and the right drive wheel; and
a motor drive apparatus that drives the first traveling motor and the second traveling motor according to claim 1.

12. A motor drive apparatus of an electric forklift which is mounted on the electric forklift and controls a traveling motor transmitting power to a drive wheel of the electric forklift based on a speed command value showing a target speed of the electric forklift, the apparatus comprising:

a torque command value generation unit that generates a torque command value indicating torque of the traveling motor in response to a gap between a speed command value of the traveling motor and a speed detection value that is a current speed of the traveling motor; and a slip detector that generates a slip ratio estimation value showing a slip state of the drive wheel based on the speed detection value and the torque command value, wherein the slip detector includes a first arithmetic unit which generates an inertial force estimation value proportional to a differential value of the speed detection value and a second arithmetic unit which generates the slip ratio estimation value in response to a relationship between the inertial force estimation value and the torque command value.

13. The motor drive apparatus of an electric forklift according to claim 12, wherein the second arithmetic unit generates the slip ratio estimation value in response to a ratio of the inertial force estimation value and the torque command value.

14. The motor drive apparatus of an electric forklift according to claim 12, wherein the slip detector further includes a low-pass filter which receives the torque command value to be output to the second arithmetic unit.

15. The motor drive apparatus of an electric forklift according to claim 12, further comprising:

a slip compensator that corrects the torque command value based on a torque compensation rate depending on the slip ratio estimation value.

16. The motor drive apparatus of an electric forklift according to claim 15, wherein a corrected torque command value is input into the slip detector.

17. The motor drive apparatus of an electric forklift according to claim 12, further comprising:

a torque limiter that limits the torque command value to be equal to or below an upper limit value which is determined in response to the speed detection value and a predetermined torque limit curve.

18. The motor drive apparatus of an electric forklift according to claim 17, wherein the slip compensator is provided in a latter stage of the torque limiter.

19. An electric forklift comprising:

a drive wheel;

a traveling motor that transmits power to the drive wheel; and a motor drive apparatus that drives the traveling motor according to claim 12.

* * * * *